(12) United States Patent
Duelli

(10) Patent No.: US 7,731,156 B2
(45) Date of Patent: Jun. 8, 2010

(54) VACUUM VALVE

(75) Inventor: Bernhard Duelli, Uebersaxen (AT)

(73) Assignee: Vat Holding AG, Haag (CH)

( * ) Notice: Subject to any disclaimer, the term of this patent is extended or adjusted under 35 U.S.C. 154(b) by 337 days.

(21) Appl. No.: 11/852,517

(22) Filed: Sep. 10, 2007

(65) Prior Publication Data

US 2008/0066811 A1   Mar. 20, 2008

(30) Foreign Application Priority Data

Sep. 20, 2006  (AT)  .............................. A 1569/2006

(51) Int. Cl.
*F16K 3/10*     (2006.01)
(52) U.S. Cl. ...................... 251/167; 251/198
(58) Field of Classification Search ................. 251/193, 251/195, 197, 198, 199, 158, 167
See application file for complete search history.

(56) References Cited

U.S. PATENT DOCUMENTS

| | | | | |
|---|---|---|---|---|
| 2,786,644 A | * | 3/1957 | Koppl | ......................... 251/187 |
| 3,170,668 A | * | 2/1965 | Aulisa | ......................... 251/187 |
| 5,566,922 A | | 10/1996 | Tanaka et al. | |
| 5,577,707 A | * | 11/1996 | Brida | ......................... 251/193 |
| 6,390,448 B1 | | 5/2002 | Krocker et al. | |
| 6,776,394 B2 | | 8/2004 | Lucas | |
| 6,913,243 B1 | * | 7/2005 | Tomasch | ..................... 251/167 |
| 6,966,538 B2 | * | 11/2005 | Hayashi et al. | ............. 251/187 |
| 2004/0079915 A1 | | 4/2004 | Contin et al. | |
| 2004/0129910 A1 | * | 7/2004 | Ishigaki | ..................... 251/193 |
| 2006/0185743 A1 | * | 8/2006 | Lucas et al. | ............ 137/599.18 |

FOREIGN PATENT DOCUMENTS

| | | |
|---|---|---|
| FR | 2 283 375 | 7/1974 |
| JP | 64-55478 | 3/1989 |
| JP | 10-231939 | 9/1998 |

* cited by examiner

*Primary Examiner*—John Bastianelli
(74) *Attorney, Agent, or Firm*—Frommer Lawrence & Haug LLP

(57) ABSTRACT

A vacuum valve including a valve housing two valve openings, a closure member having two closure plates, a transverse drive unit for adjusting the closure member between an open position and an intermediate position where the closure plates cover the valve openings, a first longitudinal drive unit for adjusting the closure member between the intermediate position and a first closed position, and a second longitudinal drive unit for adjusting the closure member between the intermediate position and a second closed. Each longitudinal drive unit includes a plurality of actuating elements which are guided into the vacuum area of the valve housing. These actuating elements are adjustable by driving elements between a retracted, passive position where their actuating ends are raised from the closure member and an advanced, active position where their actuating ends are pressed against the closure member and press the respective closure plate against the respective valve seat.

20 Claims, 9 Drawing Sheets

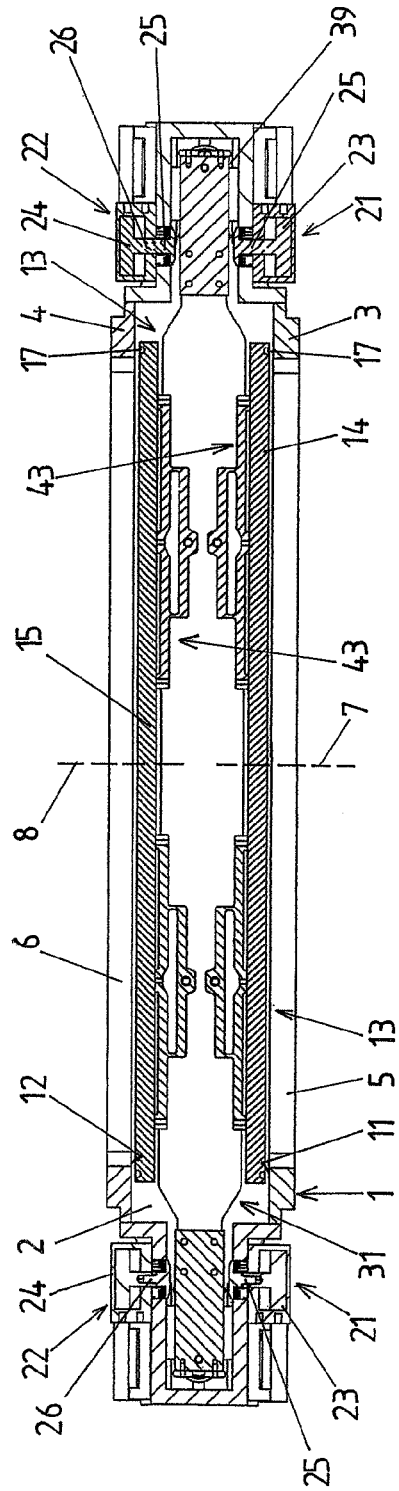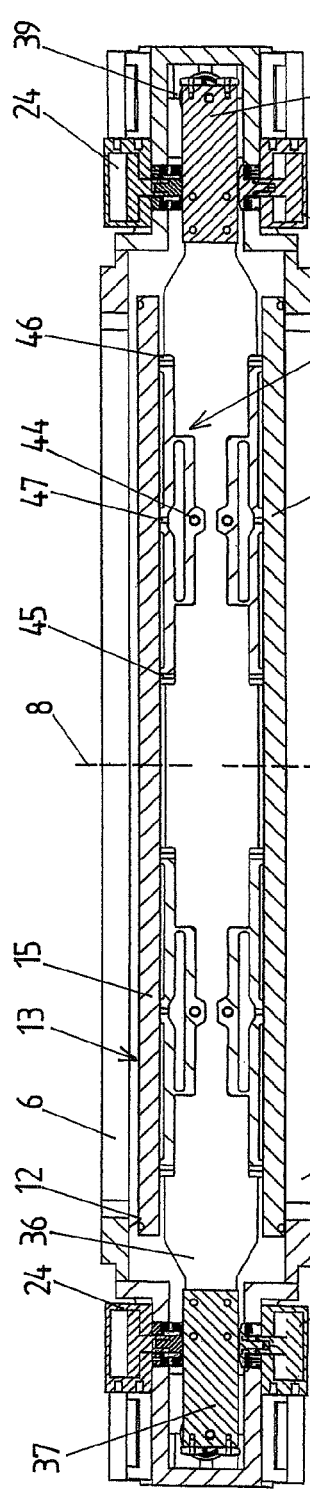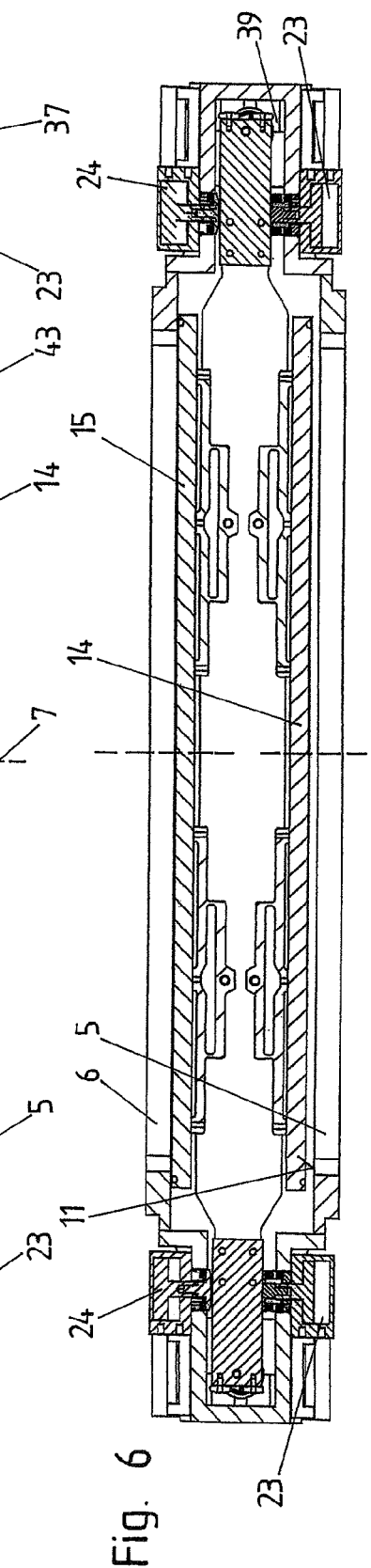

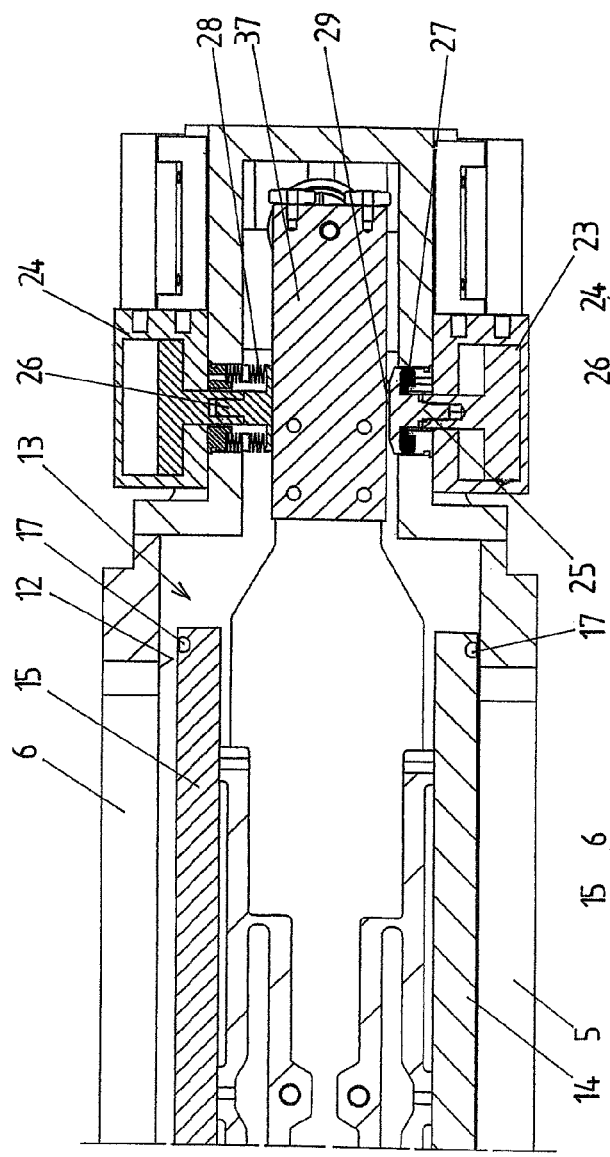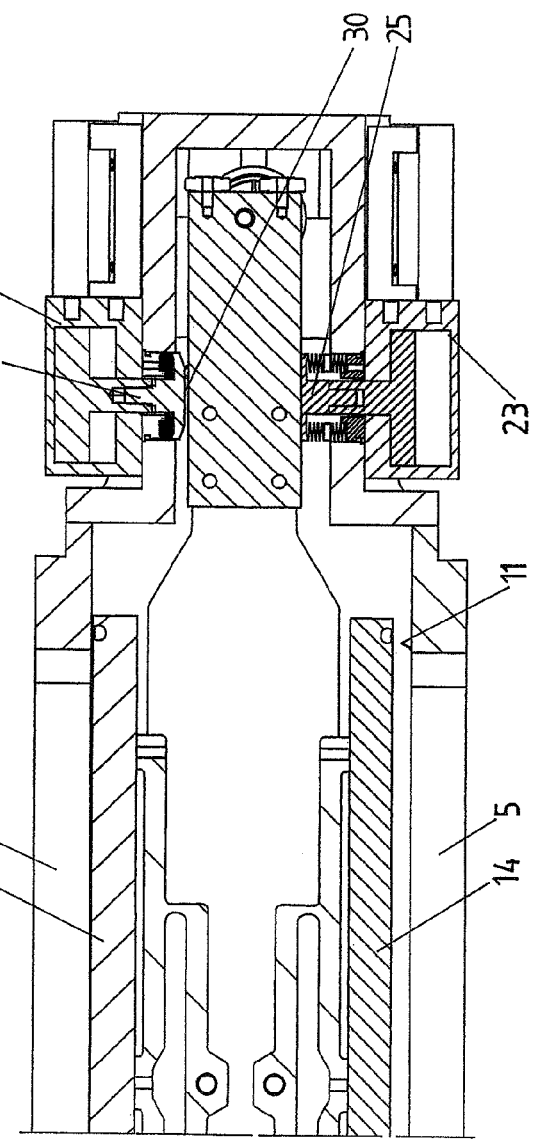

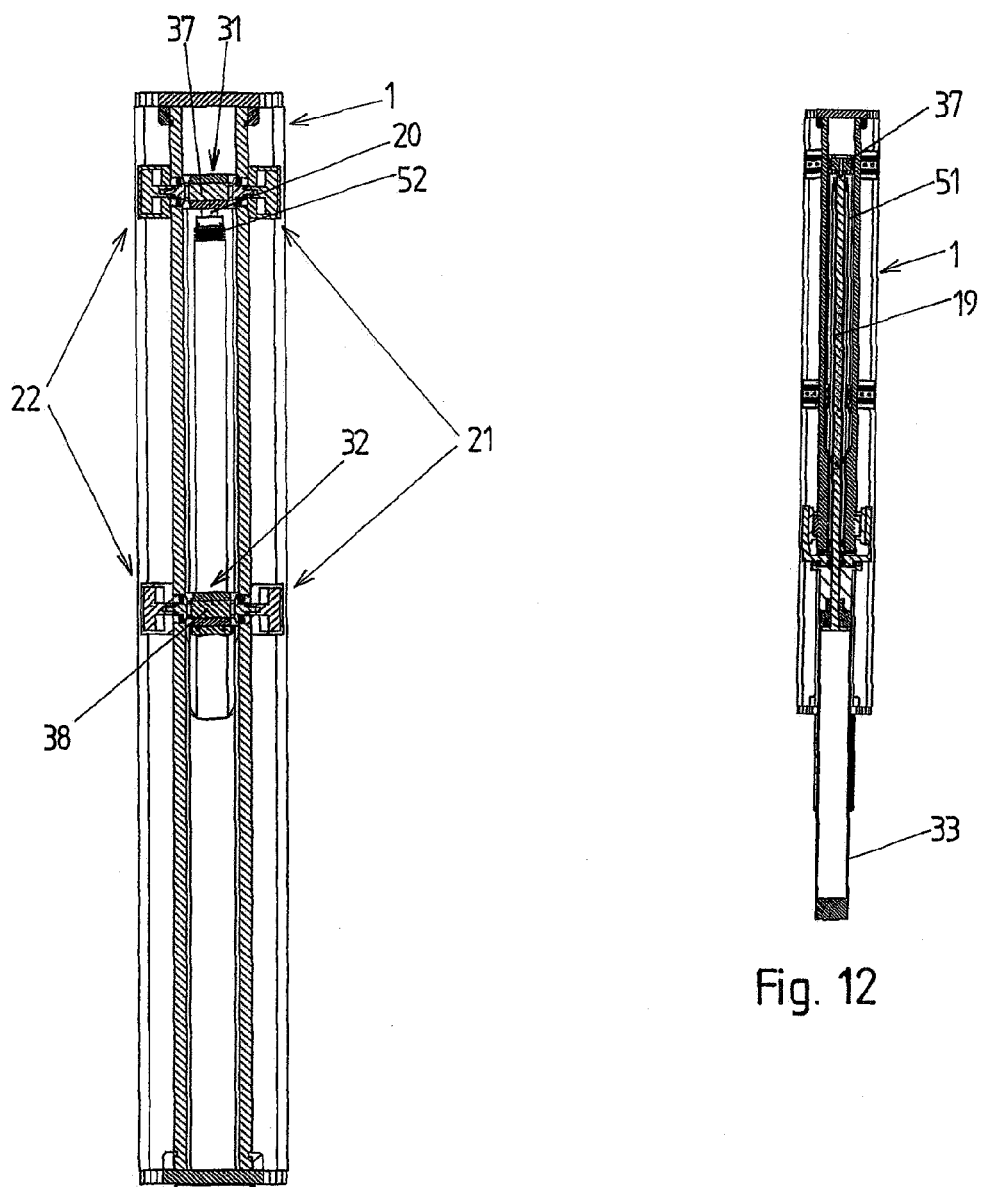

VACUUM VALVE

CROSS-REFERENCE TO RELATED APPLICATION

This application claims priority of Austrian Application No. A 1569/2006, filed Sep. 20, 2006, the complete disclosure of which is hereby incorporated by reference.

BACKGROUND OF THE INVENTION a) Field of the Invention

The invention is directed to a vacuum valve comprising a valve housing with an interior space which forms a vacuum area of the vacuum valve and with first and second valve openings which have parallel longitudinal axes and which are surrounded by first and second valve seats, a closure member comprising first and second closure plates, a transverse drive for adjusting the closure member in an actuation direction transverse to the longitudinal axes of the valve openings between an open position, in which the closure plates free the valve openings, and an intermediate position in which the closure plates cover the valve openings but are raised from the valve seat, a first longitudinal drive for adjusting the closure member between the intermediate position and a first closed position in which the first closure plate is pressed against the first valve seat, and a second longitudinal drive for adjusting the closure member between the intermediate position and a second closed position in which the second closure plate is pressed against the second valve seat.

b) Description of the Related Art

A vacuum valve of the type mentioned above is known from U.S. Pat. No. 6,390,448 B1. A closure member of this vacuum valve has first and second closure plates which can be pressed alternately against first and second valve seats surrounding first and second valve openings. By means of a transverse drive unit, the closure member is adjustable transverse to the longitudinal axes of the valve openings between an open position and an intermediate position in which the closure plates cover the valve openings but are raised from the valve seats. The transverse drive unit is arranged at a swiveling part which is swivelable around a pin. By means of a driving element, the swiveling part can be swiveled around its swiveling axis in order to press the first closure plate against the first valve seat. The driving element and the swiveling pin for the swiveling part are arranged at another swiveling part which is swivelable around another swiveling axis by means of another driving element. By swiveling the additional swiveling part around the additional swiveling axis, the second closure plate can be pressed against the second valve seat. This design is relatively complicated. Also, this vacuum valve is designed for relatively small valve openings.

U.S. Pat. No. 6,776,394 B2 discloses a vacuum valve in which a valve disk is arranged at a swiveling arm. The swiveling arm is arranged at a shaft which is swivelable around an axis of rotation and which is displaceable in direction of the axis of rotation. The shaft is guided relative to the valve housing by means of a slotted guide. A pin which acts in connection with the slotted guide, is screwed into an internal thread of the shaft and is rotatable by means of a driving element serves to displace the shaft in direction of the axis of rotation and to rotate the shaft around the axis of rotation. Further, driving elements in the form of piston-cylinder units which cooperate with tappet-like actuating elements guided into the vacuum area are provided in the valve housing. The closure plate can be pressed against the valve seat with additional force by these driving elements in the closed position of the closure plate.

In the vacuum valve known from US 2004/0079915 A1, the closure member has a carrying part at which a closure plate is arranged, this closure plate being displaceable by means of piston-cylinder units. In the position of the closure member in which it covers the valve opening, the closure plate can be pressed against the valve seat surrounding the valve opening by means of the piston-cylinder units. Also preferably provided is a supporting plate which is displaceable relative to the carrying part by means of piston-cylinder units. In the closed position of the closure plate, the supporting plate is pressed against an opposite wall of the valve housing in an area surrounding another valve opening. Elastomer rings are arranged at the closure plate and at the supporting plate for cooperating with the wall of the valve housing.

FR 2 283 375 discloses a nongeneric vacuum valve in which only one valve opening can be closed by the closure member. Contact pressing cylinders are used as a longitudinal drive to press the closure member against the valve seat of the valve opening, this closure member being guided in the lateral guide grooves. Additional contact pressing cylinders acting in the opposite direction are needed to open the closure member so as to move the closure member back in the guide grooves sufficiently to allow the valve opening to be fully freed subsequently by means of a transverse drive unit.

OBJECT AND SUMMARY OF THE INVENTION

It is the primary object of the invention to provide a simply designed vacuum valve of the type mentioned above which can also be constructed with large-opening valve openings. According to the invention, this object is met by a vacuum valve comprising a valve housing with an interior space which forms a vacuum area of the vacuum valve and with first and second valve openings which have parallel longitudinal axes and which are surrounded by first and second valve seats, a closure member comprising first and second closure plates, a transverse drive unit for adjusting the closure member in an actuation direction transverse to the longitudinal axes of the valve openings between an open position, in which the closure plates free the valve openings, and an intermediate position in which the closure plates cover the valve openings but are raised from the valve seat, a first longitudinal drive unit for adjusting the closure member between the intermediate position and a first closed position in which the first closure plate is pressed against the first valve seat, and a second longitudinal drive unit for adjusting the closure member between the intermediate position and a second closed position in which the second closure plate is pressed against the second valve seat, wherein each of the longitudinal drive units comprises a plurality of actuating elements which are guided into the vacuum area of the valve housing through vacuum feedthroughs and which have actuating ends lying inside the vacuum area, these actuating elements being adjustable by means of driving elements, which are located outside the vacuum area of the valve housing, between a retracted, passive position in which their actuating ends are raised from the closure member and an advanced, active position in which their actuating ends are pressed against the closure member and press the respective closure plate against the respective valve seat.

The invention is based on the idea that when the vacuum valve is constructed with first and second closure plates that can be pressed against first and second valve seats a differential pressure may be used to press one of the two closure plates against the corresponding valve seat regardless of the side from which this differential pressure acts. Therefore, the longitudinal drive units which serve to displace the closure member between its intermediate position and its two closed positions can be designed for a relatively small closing force. This facilitates the use of driving elements which lie outside the vacuum area and by means of which tappet-like actuating ends that are introduced into the vacuum area through vacuum feedthroughs are displaced between retracted, passive positions and advanced, active positions. In the passive positions, each of the actuating ends of the actuating elements is raised from the closure member. In their active positions, these actuating ends press the respective closure plate of the closure member against the associated valve seat.

In an advantageous embodiment form of the invention, each actuating element is displaceable between its passive position and its active position by its own driving element. The driving elements are advantageously formed as pneumatically acting piston-cylinder units.

The first and second closure plates are preferably arranged at a carrier arrangement having at least two parallel carriers. The latter extend at right angles to the longitudinal axes of the valve openings and at right angles to the actuating direction of the transverse drive unit and extend over at least most of the extension of the first and second closure plate. These carriers advantageously have end portions which project over the first closure plate and second closure plate on both sides, the actuating elements of the longitudinal drive units acting at these end portions of the carriers. The closure plates themselves can be constructed so as to be relatively flexible compared to the carriers. In order to make it possible to adapt the closure plates in a certain manner to deformations in the valve housing, it is advantageous when the closure plates are connected to the carriers by connection parts in which a force acting on an individual central connection point between the carrier and the connection part is transmitted to two or more connection points of the respective closure plate and the respective carrier, which connection points are spaced apart in direction of the longitudinal extension of the carriers.

Further advantages and details of the invention are described in the following with reference to the accompanying drawings which show further objects of the invention.

BRIEF DESCRIPTION OF THE DRAWINGS

In the drawings:

FIG. 4 shows a section along line A-A of FIG. 3;

FIGS. 5 and 6 show sections analogous to FIG. 4 in the first closed position and second closed position of the closure member;

FIGS. 7 and 8 show enlarged sections of FIG. 5 and FIG. 6;

FIG. 11 shows a section along line D-D of FIG. 3;

FIG. 12 shows a section along line E-E of FIG. 3;

FIG. 13 shows an oblique view of a connection part for connecting a valve plate to a carrier of the carrier arrangement;

Figure 1:
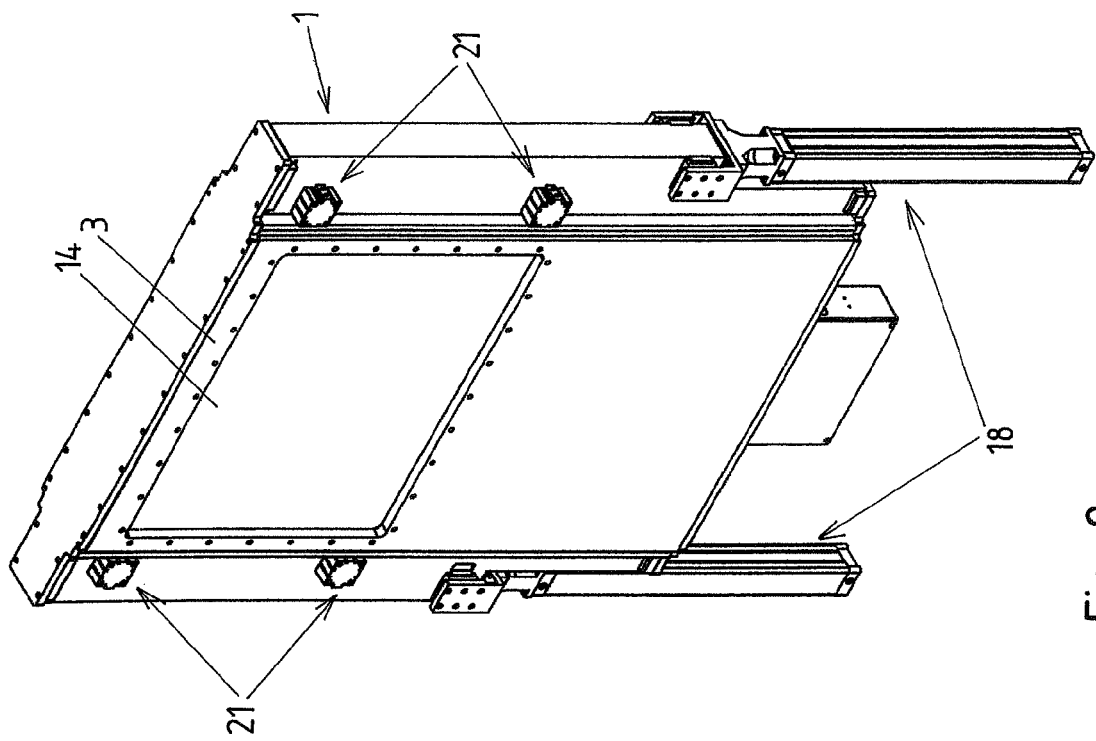
FIG. 1 shows an oblique view of an embodiment example of a vacuum valve according to the invention in the open position of the closure member.

The figures are drawn to different scales.

DESCRIPTION OF THE PREFERRED EMBODIMENT EXAMPLES

An embodiment example of a vacuum valve according to the invention is shown in the drawings. The vacuum valve has a valve housing 1 with an interior space 2 which forms a vacuum area of the vacuum valve. Opposite side walls 3, 4 of the valve housing are penetrated by a first valve opening 5 and a second valve opening 6. The portions of the side walls 3, 4 penetrated by the valve openings 5, 6 lie in parallel planes, and the valve openings 7, 8 penetrate the side walls 3, 4 at right angles to these planes so that the longitudinal axes 7, 8 of the valve openings 5, 6 are parallel to one another.

The longitudinal axes 7, 8 preferably coincide, as can be seen from the accompanying drawing, and the valve openings 5, 6 which are aligned with one another have the same shape and size. In particular, the valve openings have a rectangular shape when viewing the valve housing 1 in direction of the longitudinal axes 7, 8, the narrow sides of the valve openings extending parallel to the displacement direction of the transverse drive unit 18 which will be described in the following. The construction according to the invention can be used in a particularly advantageous manner for vacuum valves with large valve openings 5, 6. For example, the narrow side of the respective valve opening 5, 6 is at least 400 mm and the broad side of the respective valve opening is at least 800 mm.

The valve openings 5, 6 are surrounded by threaded bore holes 9 which are constructed as pocket holes and which are arranged at the outer sides of the side walls 3, 4. The threaded bore holes 9 surrounding the first valve opening 5 are visible in the drawing. The threaded bore holes surrounding the second valve opening 6 are completely analogous. Sealing surfaces are arranged between the threaded bore holes 9 and the edges of the valve openings 5, 6. In this way, connection flanges are formed for connecting the valve housing 1 to other vacuum devices, particularly vacuum chambers. A vacuum valve according to the invention can be arranged, for example, between two vacuum chambers of a system by which processes can be carried out during the production of semiconductor components.

Flanges for connecting the vacuum valve to vacuum devices, for example, vacuum chambers, can also be constructed in a different manner.

The valve housing 1 has the first valve seat 11 and second valve seat 12 surrounding the first valve opening and second valve opening. In the embodiment example shown in the drawing, these valve seats 11, 12 are formed as sealing surfaces at the inner sides of the side walls 3, 4.

A closure member 13 is arranged in the interior space 2 of the valve housing 1. This closure member 13 comprises a first closure plate 14 and a second closure plate 15 which are held by a carrier arrangement of the closure member 13. Each of the closure plates 14, 15 has a flexible sealing ring 17. Accordingly, when the respective closure plate 14, 15 is pressed against the respective valve seat 11, 12, the respective valve opening 5, 6 is sealed. It would also be conceivable and possible, for example, to arrange the sealing rings 17 at the valve seats 11, 12 and to provide at the closure plates 14, 15 sealing surfaces cooperating with the sealing rings 17 arranged at the valve seats 11, 12.

The closure plates 14, 15 preferably have the same shape and size and are arranged coaxially (i.e., so as to be aligned).

Figure 2:
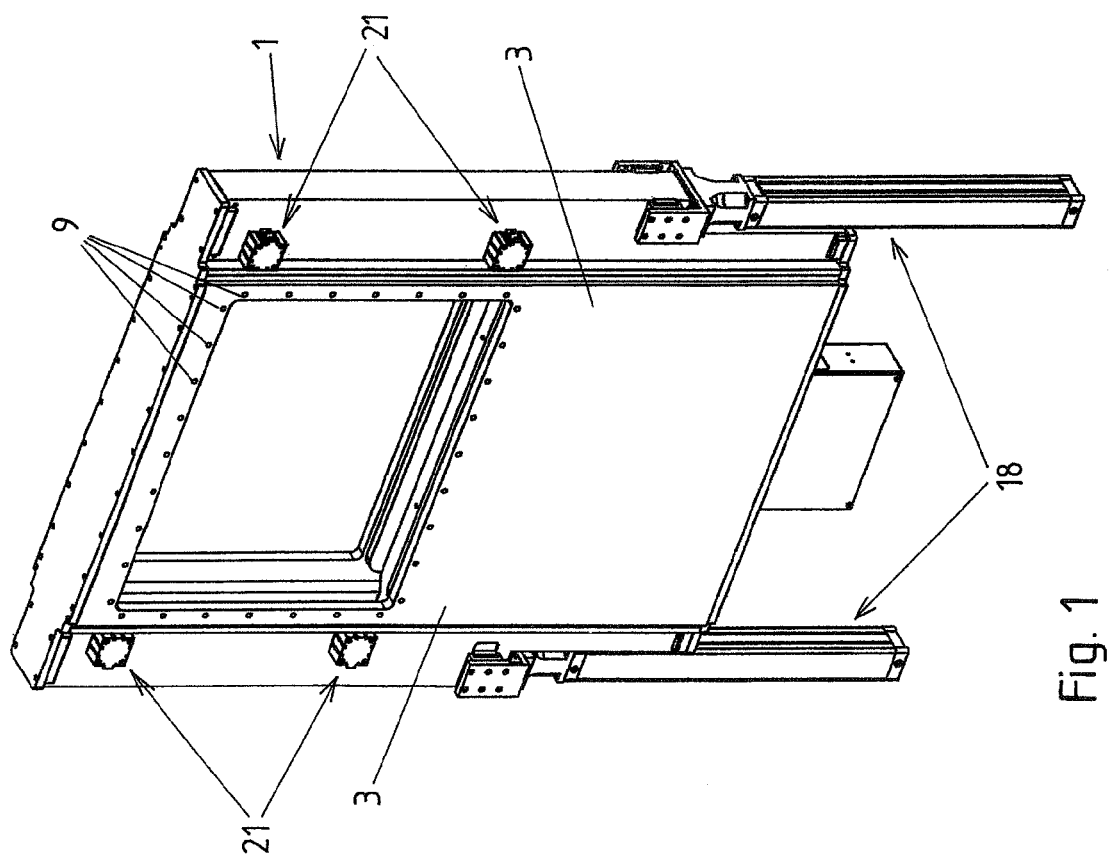
FIG. 2 shows an oblique view analogous to FIG. 1 in the intermediate position of the closure member.
Figure 3:
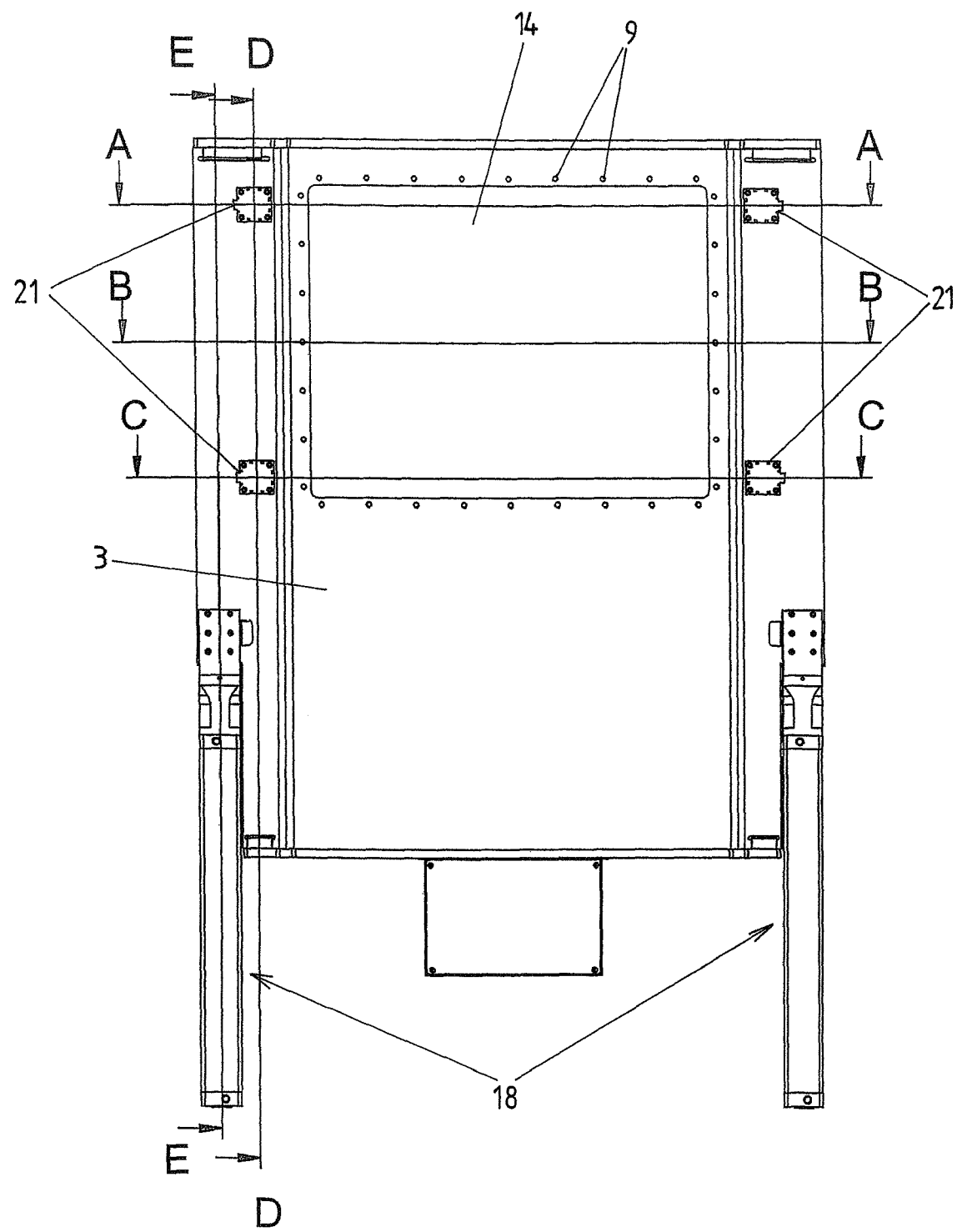
FIG. 3 shows the vacuum valve in the intermediate position of the closure member.
Figure 9:
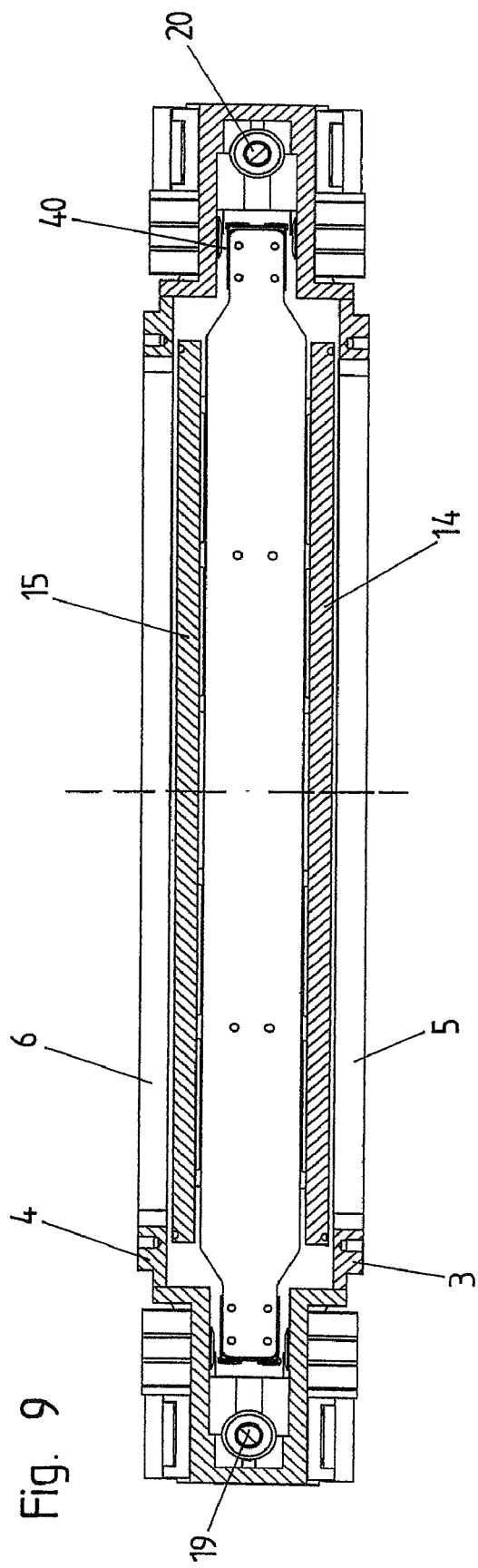
FIG. 9 shows a section along line B-B of FIG. 3.
Figure 10:
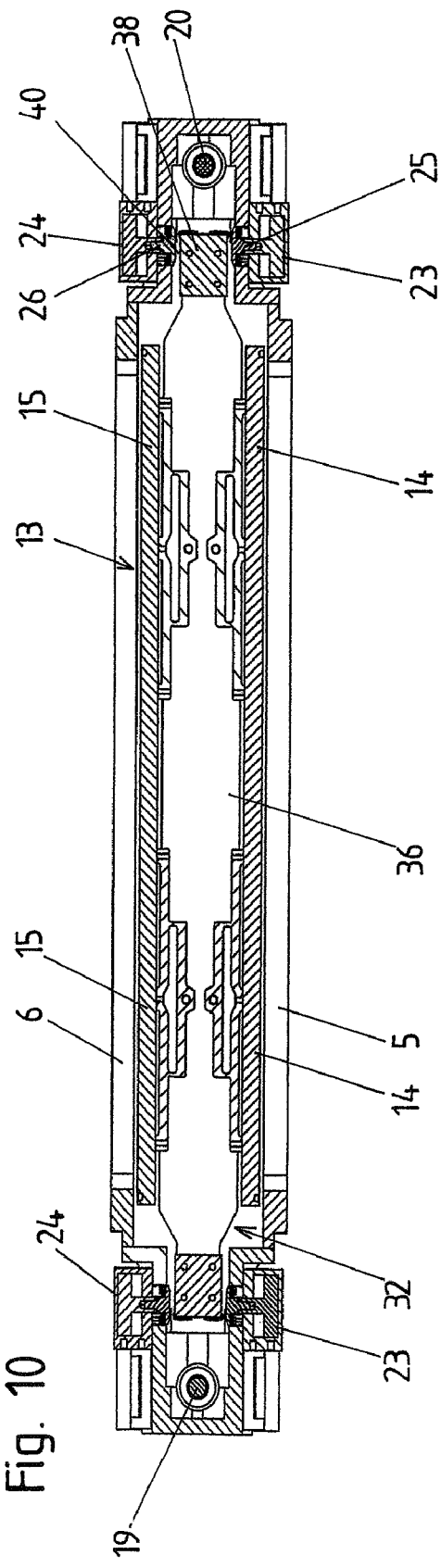
FIG. 10 shows a section along line C-C of FIG. 3.
Figure 14:
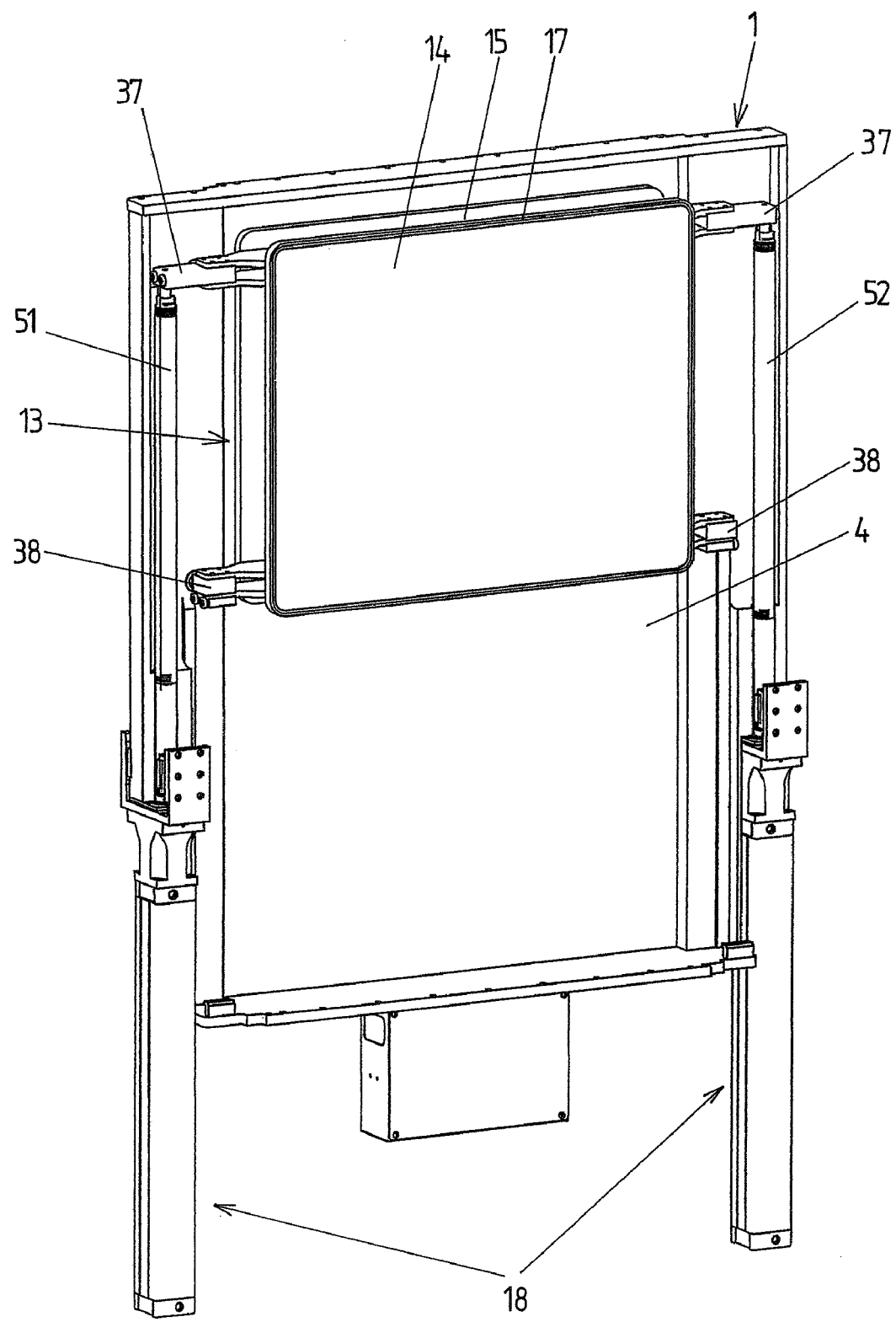
FIG. 14 shows an oblique view of the vacuum valve in the intermediate position of the closure member without the front side wall of the valve housing.
Figure 15:
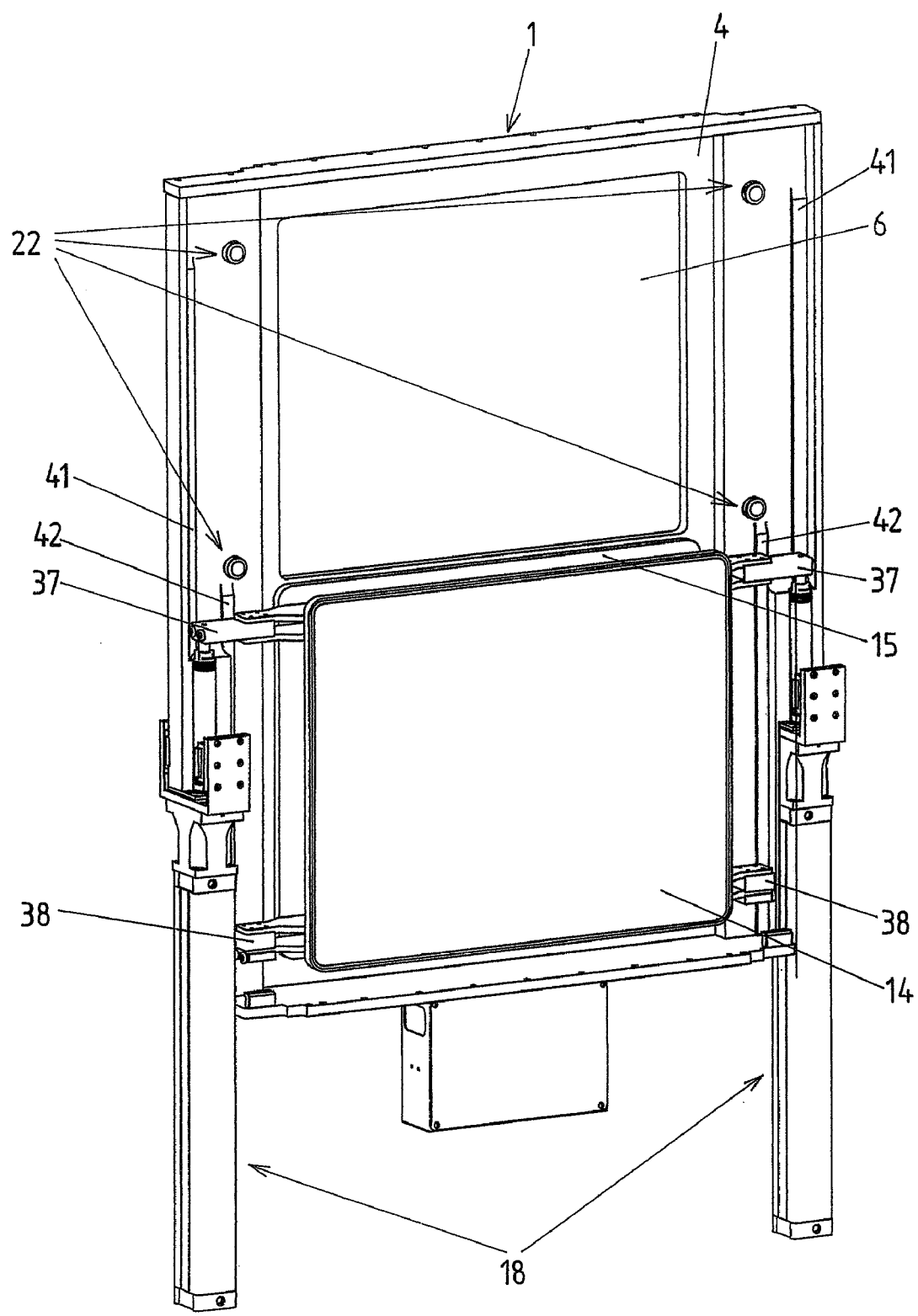
FIG. 15 shows an oblique view analogous to FIG. 14 in the open position of the closure member.
Figure 16:
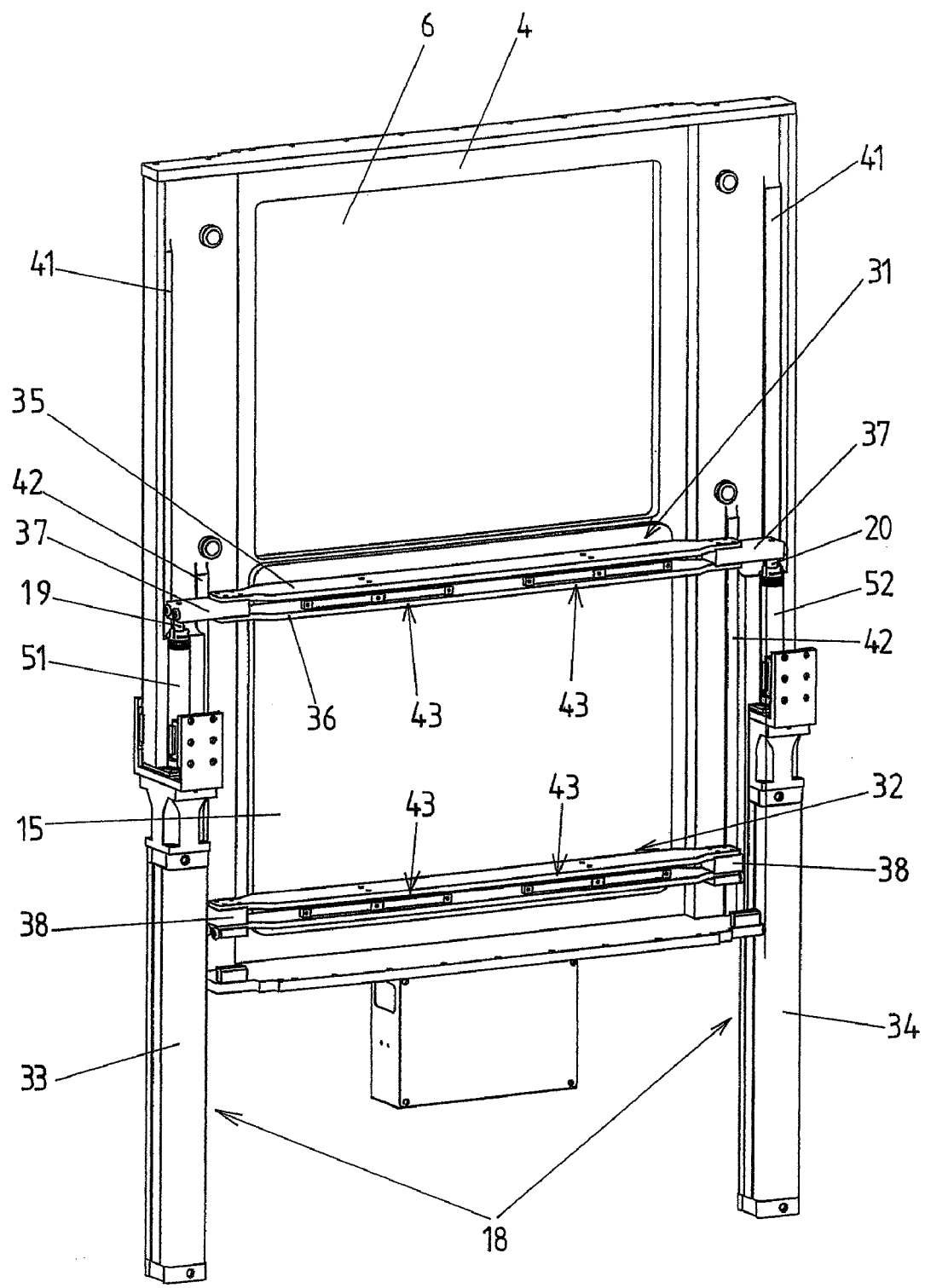
FIG. 16 shows an oblique view analogous to FIG. 15 without the front valve plate.

In the interior space 2 of the valve housing 1, the closure member 13 is displaceable between an open position (FIGS. 1, 15 and 16), an intermediate position (FIGS. 2, 3, 4, 9, 10, 11, 12, 14) and a first and second closed position (FIGS. 5, 7; FIGS. 6, 8; the views in FIGS. 2 and 3 would look the same in the closed positions). In the open position, the closure plates 14, 15 free the valve openings 5, 6. In the intermediate position, the closure plates 14, 15 cover the valve openings 5, 6 (viewed in direction of the longitudinal axes 7, 8) but are raised from the valve seats 11, 12. In the first closed position, the first closure plate 14 is pressed against the first valve seat 11 so that the first valve opening 5 is sealed. In the second closed position, the second closure plate 15 is pressed against the second valve seat 12 so that the second valve opening 6 is sealed.

A transverse drive unit 18 serves to adjust the closure member 13 between its open position and its intermediate position, which is carried out by means of displacement in a straight line at right angles to the longitudinal axes 7, 8 of the valve openings 5, 6. In the embodiment example shown herein, this transverse drive unit 18 is formed by two pneumatically acting piston-cylinder units whose piston rods 19, 20 act at the closure member 13. In so doing, the piston rods 19, 20 are guided into the vacuum area of the valve housing 1 through vacuum feedthroughs. In the embodiment example shown herein, these vacuum feedthroughs are in the form of bellows 51, 52, particularly diaphragm bellows, which are connected in a vacuum-tight manner to the piston rods 19, 20 on one side and to the valve housing 1 on the other side. Vacuum feedthroughs of this kind can also be constructed differently.

A first longitudinal drive unit 21 serves to adjust the closure member 13 between its intermediate position and its first closed position, which is carried out by means of displacement in a straight line in direction parallel to the longitudinal axes 7, 8 of the valve openings 5, 6. This first longitudinal drive unit 21 comprises a plurality of driving elements 23 which are arranged outside of the vacuum area of the valve housing 1 and which are formed in the present embodiment example by piston-cylinder units and tappet-like actuating elements 25 which can be displaced by the driving elements 23 between a retracted, passive position (see, e.g., FIGS. 4, 6 and 8) and an advanced, active position (see FIGS. 5 and 7). The actuating elements 25 are guided into the vacuum area of the valve housing 1 through vacuum feedthroughs 27 and have actuating ends 29 lying within the vacuum area. In the embodiment example shown herein, these vacuum feedthroughs 27 are in the form of bellows, particularly diaphragm bellows, which are connected in a vacuum-tight manner to the valve housing 1 on one side and to the actuating element 25 on the other side. Instead of this, a vacuum feedthrough 27 of this kind could also be formed, for example, by a flexible sealing ring which is arranged in the opening of the valve housing 1 penetrated by the actuating element 25, an outer surface of the actuating element 25 contacting this flexible sealing ring in a displaceable manner.

In their passive positions, the actuating ends 29 of the actuating elements 25 are raised from the closure member 13. In their active positions, the actuating ends 29 are pressed against the closure member 13, namely at an upper surface of the closure member 13 facing away from the first valve opening 5, so that the closure member 13 is displaced in its first closed position and the first closure plate 14 is pressed against the first valve seat 11.

A second longitudinal drive unit 22 serves to adjust the closure member 13 between its intermediate position and its second closed position, which is carried out by means of displacement in a straight line in direction parallel to the longitudinal axes 7, 8 of the valve openings 5, 6. This second longitudinal drive unit 22 is constructed in a manner completely analogous to the first longitudinal drive unit 21 and has the tappet-like actuating elements 26 which can be guided into the vacuum area of the valve housing 1 through vacuum feedthroughs 28 and can be displaced between retracted, passive positions and advanced, active positions by the driving elements 24 which are arranged outside the vacuum area. In the advanced, active positions, the actuating ends 30 of the actuating elements 26 press the second closure plate 15 against the second valve seat 12, wherein they act at an upper surface of the closure member 13 facing away from the second valve opening 6.

The displacement of the actuating elements 25, 26 between their passive positions and active positions is preferably carried out in a direction parallel to the valve openings 5, 6.

In the present embodiment example in which the driving elements 23, 24 are formed by piston-cylinder units, the tappet-like actuating elements 25, 26 are connected to the pistons and piston rods of these driving elements 23, 24, wherein it is possible for the construction to comprise one or more parts. There are, for example, four driving elements 23, 24 and actuating elements 25, 26 per longitudinal drive unit 21, 22 as is shown. There could also be more or fewer driving elements 23, 24 and actuating elements 25, 26.

The driving elements 24 of the second longitudinal drive unit 22 are arranged on the opposite side of the valve housing 1 relative to the driving elements 23 of the first longitudinal drive unit 21. Although it is advantageous to provide each actuating element 25, 26 with its own driving element 23, 24, there are also conceivable and possible constructions in which two or more actuating elements 25, 26 are actuated by a common driving element 23, 24. In the embodiment example shown herein, the driving elements 23, 24 and actuating elements 25, 26 of the longitudinal drive units 21, 22 are only arranged next to sides of the valve openings oriented parallel to the adjusting direction of the transverse drive unit 18. The driving elements 23, 24 and actuating elements 25, 26 are located outside of the flange area surrounding the valve opening 5, 6.

The carrier arrangement of the closure member 13 by which the closure plates 14, are held comprises two carriers 31, 32 which extend at right angles to the adjusting direction of the transverse drive unit 18 and at right angles to the longitudinal axes 7, 8 of the valve openings 5, 6. For purposes of holding and reinforcing the closure plates 14, 15, the latter extend over at least most of the width of the closure plates 14, 15 as measured in direction of the longitudinal extension of the carries 31, 32. The carriers 31, 32 advantageously project over both sides of the closure plates 14, 15 by their end portions. In the area of these end portions, the actuating elements 25, 26 of the longitudinal drive units 21, 22 act at the carriers 31, 32.

The piston rods 19, 20 of the piston-cylinder units of the transverse drive unit 18 are connected to the end portions of the carrier 31 at the greatest distance from the cylinders 33, 34 of the piston-cylinder units of the transverse drive unit 18, these end portions projecting over the closure plates 14, 15, so that the overall size of the vacuum valve can be minimized. The projecting end portions of the other carrier 32 are correspondingly shorter so as to allow the piston rods 19, 20 to move past them and to make it possible for this carrier 32 to move into the area between the cylinders 33, 34.

In the embodiment example shown herein, the carriers 31, 32 have two webs 35, 36 at a distance from one another. Engagement blocks 37, 38 which are acted upon by the actuating elements 25, 26 of the longitudinal drive units 21, 22 are arranged between the webs 35, 36 at both ends of the latter. Further, the piston rods 19, 20 act on the engagement blocks 37 of the carrier 31.

The end portions of the carriers 31, 32 projecting over the side edges of the closure plates 14, 15 can be used to guide the valve member 13 relative to the valve housing 1. For this purpose, these end portions of the carriers 31, 32, which form lateral projections of the closure member 13, are received in intermediate guideways 39, 40. Strip-shaped projections 41, 42 are arranged at lateral portions of the side walls 3, 4 to form these intermediate guideways 39, 40. When the closure member 13 is in its intermediate position, these projections 41, 42 end before those locations within whose area the engagement blocks 37, 38 extend. In this way the intermediate guideways 39, 40 are enlarged so that the closure member 13 can be displaced in its first and second closed position. Along the displacement path between the open position of the closure member 13 until just before its intermediate position is reached, this guiding prevents the closure plates 14, 15 from running against the valve housing 1 when lateral forces act on the closure member 13 or when displacement by means of the transverse drive unit 18 leads to vibration resonance.

The carrier arrangement could also have more than two carriers 31, 32 arranged at right angles to the longitudinal axes 7, 8 of the valve openings 5, 6 and at right angles to the displacing direction of the transverse drive unit 18.

Connection parts 43 serve to connect the closure plates 14, 15 to the carriers 31, 32. In this way, the connection of the closure plates 14, 15 to the carriers 31, 32 is formed with a flexibility such that it is possible to adapt to elastic deformations of the valve housing 1. It is precisely in large valves with large valve openings 5, 6 that such deformations can occur. In practice, these deformations are substantially greater in direction perpendicular to the displacement direction of the transverse drive unit and perpendicular to the longitudinal axes 7, 8 of the valve openings 5,6 than in direction parallel to the displacement direction of the transverse drive unit 18.

The connection parts 43 are connected to the respective carrier 31, 32 at least one connection point 44 on one side and to the respective closure plate 14, 15 at least two connection points 45, 46 on the other side. These two connection points 45, 46 are at a distance from one another in direction of the carriers 31, 32 and lie on both sides of the connection point 43 to the carrier 31, 32. In the present embodiment example, another connection point 47 to the respective closure plate 14, 15 is located between the two connection points 45, 46.

The connection parts 43 have connection arms 48, 49 extending from the connection point 44 to the carrier 31, 32 on both sides in direction of the carrier 31, 32. These connection arms 48, 49 are connected at their ends to a common connection leg 50 which extends in longitudinal direction of the carrier 31, 32 and, in so doing, projects over the connection arms 48, 49 at both sides and is connected to the closure plate 14, 15 at least in the area of its two ends and, in the present embodiment example, also in a middle area. Screws, which are not shown in the drawings for the sake of simplicity, serve to connect to the closure plate 14, 15 at the connection points 45, 46, 47. The connection to the respective carrier 31, 32 is carried out by means of a pin which extends between the webs 35, 36 and which penetrates a corresponding opening at the connection point 44 of the connection part 43. In this case, the connection part 43 can be connected to the carrier 31, 32 so as to be swivelable relative to the carrier 31, 32 around an axis extending parallel to the displacement direction of the transverse drive unit 18.

For example, a respective closure plate 14, 15 is connected to the respective carrier 31, 32 by two connection parts 43 that are spaced apart in longitudinal direction of the carrier.

In a vacuum valve constructed according to the invention, the longitudinal drive units 21, 22 can advantageously exert relatively small closing forces in the closed positions of the closure member 13. However, it is also possible to seal the vacuum valve relative to differential pressures which exert a substantially higher force on the closure member 13. For this purpose, depending upon the direction in which the differential pressure acts, the closure member 1 is brought into that one of its closed positions in which the differential pressure increases the pressing of the respective closure plate 14, 15 against the respective valve seat 11, 12.

When there is only a slight differential pressure or none at all between the two valve openings 5, 6, only a relatively small sealing force acts on the respective sealing ring 17 in the first or second closed position of the closure member 13. In an advantageous manner, this sealing force is at least large enough so that there is no entrainment of gas between the vacuum devices, e.g. vacuum chambers, connected to the vacuum valve.

In the present embodiment example, the contact pressing force exerted on the respective closure plate 14, 15 by the respective longitudinal drive unit 21, 22 in the respective closed position is in the range of 2 N to 4 N per mm sealing length, e.g., 3 N per mm sealing length. In the event of additional differential pressure forces, the latter are superimposed on the contact pressing force exerted by the respective longitudinal drive unit 21, 22.

The advantage of a relatively small contact pressure force exerted by the longitudinal drive units 21, 22 consists particularly in that there is relatively little stress on the sealing rings 17 in the closed positions of the closure member 13. For example, corrosive process gases are often used in semiconductor processes carried out under vacuum. These corrosive process gases act on the material of the sealing rings more aggressively as the stress on the material increases. Very expensive materials have already been developed which can withstand the corrosive process gases for relatively long periods even in a stressed state. However, comparatively cheap materials can be used for the sealing rings 17 in the vacuum valve according to the invention. The differential pressures occurring while the semiconductor process, particularly a coating process or etching process, is carried out using a corrosive process gas are rather small. When one of the two chambers between which the vacuum valve is arranged is flooded after a semiconductor process of this kind or for servicing work, the closure member 13 is first brought into the closed position in which it closes the valve opening 5, 6 connected to the vacuum chamber that has not been flooded.

To bring a vacuum valve according to the invention from its open state to its closed state, the closure member 13 is initially displaced from its open position to its intermediate position by means of the transverse drive unit 18. It is then adjusted to one of its closed positions by means of one of the longitudinal drive units 21, 22. The closed position in which a differential pressure expected in the course of the process to be carried out leads to an increased contact pressing force of the respective closure plate 14, 15 against the respective valve seat 11, 12 is selected for this purpose.

Various modifications of the embodiment example shown herein are conceivable and possible without departing from the field of the invention. For example, the driving elements 23, 24 could also be formed by electric motors, e.g., linear motors or electric axial drives, or by electromagnetic actuators.

As follows from the preceding description, the range of the invention is not limited to the embodiment examples shown herein, but rather should be defined with reference to the appended claims together with their full range of possible equivalents.

While the preceding description and drawings show the invention, it is obvious to a person skilled in the art that various modifications can be carried out without departing from the spirit of and field of the invention.

REFERENCE NUMBERS 1 valve housing
2 interior space
3 side wall
4 side wall
5 first valve opening
6 second valve opening
7 longitudinal axis
8 longitudinal axis
9 threaded bore hole
11 first valve seat
12 second valve seat
13 closure member
14 first closure plate
15 second closure plate
17 sealing ring
18 transverse drive unit
19 piston rod
20 piston rod
21 first longitudinal drive unit
22 second longitudinal drive unit
23 driving element
24 driving element
25 actuating element
26 actuating element
27 vacuum feedthrough
28 vacuum feedthrough
29 actuating end
30 actuating end
31 carrier
32 carrier
33 cylinder
34 cylinder
35 web
36 web
37 engagement block
38 engagement block
39 intermediate guideway
40 intermediate guideway
41 projection
42 projection
43 connection part
44 connection point
45 connection point
46 connection point
47 connection point
48 connection arm
49 connection arm
50 connection leg
51 bellows
52 bellows

What is claimed is:

1. A vacuum valve comprising:
a valve housing with an interior space which forms a vacuum area of the vacuum valve and having a first valve opening and a second valve opening which have parallel longitudinal axes and which are surrounded by a first valve seat and a second valve seat;
a closure member comprising a first closure plate and a second closure plate;
a transverse drive unit for adjusting the closure member in an actuation direction transverse to the longitudinal axes of the valve openings between an open position, in which the closure plates free the valve openings, and an intermediate position in which the closure plates cover the valve openings but are raised from the valve seats;
a first longitudinal drive unit for adjusting the closure member between the intermediate position and a first closed position in which the first closure plate is pressed against the first valve seat; and
a second longitudinal drive unit for adjusting the closure member between the intermediate position and a second closed position in which the second closure plate is pressed against the second valve seat;
each of the longitudinal drive units comprising a plurality of actuating elements which are guided into the vacuum area of the valve housing through vacuum feedthroughs and which have actuating ends lying inside the vacuum area;
said actuating elements being adjustable by driving elements, which are located outside the vacuum area of the valve housing, between a retracted, passive position in which their actuating ends are raised from the closure member and an advanced, active position in which their actuating ends are pressed against the closure member and press the respective closure plate against the respective valve seat;
wherein the first closure plate and the second closure plate are arranged at a carrier arrangement having at least two carriers which are arranged at right angles to the longitudinal axes of the valve openings and at right angles to the adjusting direction of the transverse drive unit and which extend over at least most of the width of the closure plates measured in direction of the carriers.

2. The vacuum valve according to claim 1;
wherein each actuating element is displaceable by its own driving element.

3. The vacuum valve according to claim 1;
wherein the driving elements are constructed as piston-cylinder units.

4. The vacuum valve according to claim 1;
wherein the actuating elements can be displaced between their passive positions and active positions parallel to the longitudinal axes of the valve openings.

5. The vacuum valve according to claim 1;
wherein the transverse drive unit acts at one of the carriers.

6. The vacuum valve according to claim 1;
wherein the carriers have end portions which project over the first closure plate and second closure plate on both sides, the actuating elements of the longitudinal drive units acting at these end portions of the carriers.

7. The vacuum valve according to claim 1;
wherein connection parts for connecting the closure plates to the carriers are provided with a certain elasticity so as to make it possible to adapt to deformations in the valve housing, and wherein the connection parts are connected to the respective carrier at least at one connection point on one side and to the respective closure plate on the other side at least at two connection points which are spaced apart in direction of the carrier and lie on both sides of the connection point to the carrier.

8. The vacuum valve according to claim 7;
wherein connection arms extending from the connection point to the carrier on both sides in direction of the carrier are connected at their ends to a common connection leg which extends in longitudinal direction of the carrier and whose end portions project over the connection arms at both sides and which is connected to the respective closure plate at least in the area of its two end portions.

9. A vacuum valve comprising:
a valve housing with an interior space which forms a vacuum area of the vacuum valve and having a first valve opening and a second valve opening which have parallel longitudinal axes and which are surrounded by a first valve seat and a second valve seat;
a closure member comprising a first closure plate and a second closure plate;
a transverse drive unit for adjusting the closure member in an actuation direction transverse to the longitudinal axes of the valve openings between an open position, in which the closure plates free the valve openings, and an intermediate position in which the closure plates cover the valve openings but are raised from the valve seats;
a first longitudinal drive unit for adjusting the closure member between the intermediate position and a first closed position in which the first closure plate is pressed against the first valve seat; and
a second longitudinal drive unit for adjusting the closure member between the intermediate position and a second closed position in which the second closure plate is pressed against the second valve seat;
each of the longitudinal drive units comprising a plurality of actuating elements which are guided into the vacuum area of the valve housing through vacuum feedthroughs and which have actuating ends lying inside the vacuum area;
said actuating elements being adjustable by driving elements, which are located outside the vacuum area of the valve housing, between a retracted, passive position in which their actuating ends are raised from the closure member and an advanced, active position in which their actuating ends are pressed against the closure member and press the respective closure plate against the respective valve seat;
wherein the valve housing has a guide for the closure member by which the closure plates are held at a distance from the valve housing when the closure member is displaced from its open position to its intermediate position before reaching its intermediate position; and
wherein intermediate guideways are provided in the valve housing for guiding the closure member, and projections of the closure member which project from the closure member at right angles to the adjusting direction of the transverse drive unit and at right angles to the longitudinal axes of the valve openings project into these intermediate guideways.

10. The vacuum valve according to claim 1;
wherein the valve openings have a rectangular shape when viewing the valve housing in direction of the longitudinal axes of the valve openings, wherein their narrow sides extend parallel to the adjusting direction of the transverse drive unit.

11. The vacuum valve according to claim 10;
wherein the narrow side of the respective valve opening is at least 400 mm and the broad side of the respective valve opening is at least 800 mm.

12. The vacuum valve according to claim 1;
wherein the driving element and the actuating elements of the longitudinal drive units are only located next to sides of the valve openings oriented parallel to the adjusting direction of the transverse drive unit.

13. The vacuum valve according to claim 1;
wherein the driving elements of the second longitudinal drive unit and the driving elements of the first longitudinal drive unit are arranged on opposite sides of the valve housing.

14. The vacuum valve according to claim 1;
wherein flexible sealing rings are provided for sealing the closure plates relative to the valve housing.

15. The vacuum valve according to claim 14;
wherein a pressing force pressing the respective closure plate against the respective valve seat is exerted by the respective longitudinal drive unit in the respective closed position of the closure member, this pressing force ranging from 2 N to 4 N per mm of the length of the respective sealing ring.

16. The vacuum valve according to claim 9;
wherein each actuating element is displaceable by its own driving element.

17. The vacuum valve according to claim 9;
wherein the driving elements are constructed as piston-cylinder units.

18. The vacuum valve according to claim 9;
wherein the actuating elements can be displaced between their passive positions and active positions parallel to the longitudinal axes of the valve openings.

19. The vacuum valve according to claim 9;
wherein the first closure plate and the second closure plate are arranged at a carrier arrangement having at least two carriers which are arranged at right angles to the longitudinal axes of the valve openings and at right angles to the adjusting direction of the transverse drive unit and which extend over at least most of the width of the closure plates measured in direction of the carriers.

20. The vacuum valve according to claim 9;
wherein the transverse drive unit acts at one of the carriers.

* * * * *